(12) United States Patent
Nakano et al.

(10) Patent No.: US 7,644,090 B2
(45) Date of Patent: Jan. 5, 2010

(54) METHOD AND APPARATUS FOR FAST SIMILARITY-BASED QUERY, SELF-JOIN, AND JOIN FOR MASSIVE, HIGH-DIMENSION DATASETS

(75) Inventors: Russell Toshio Nakano, Sunnyvale, CA (US); Stanley Cheng, San Francisco, CA (US)

(73) Assignee: Nahava Inc., Sunnyvale, CA (US)

( * ) Notice: Subject to any disclaimer, the term of this patent is extended or adjusted under 35 U.S.C. 154(b) by 0 days.

(21) Appl. No.: 11/767,521

(22) Filed: Jun. 24, 2007

(65) Prior Publication Data

US 2007/0299865 A1 Dec. 27, 2007

Related U.S. Application Data

(60) Provisional application No. 60/805,926, filed on Jun. 27, 2006.

(51) Int. Cl.
*G06F 17/30* (2006.01)
(52) U.S. Cl. ............................... 707/100; 707/1; 707/3; 707/102
(58) Field of Classification Search ............... 707/1, 707/3, 100, 102, 200
See application file for complete search history.

(56) References Cited

U.S. PATENT DOCUMENTS

| | | | | |
|---|---|---|---|---|
| 5,884,320 A * | 3/1999 | Agrawal et al. | ........... | 707/104.1 |
| 6,084,595 A * | 7/2000 | Bach et al. | ................... | 345/589 |
| 6,381,605 B1 * | 4/2002 | Kothuri et al. | ............... | 707/100 |
| 6,697,818 B2 * | 2/2004 | Li et al. | .................. | 707/103 R |
| 7,007,019 B2 * | 2/2006 | Kanno | ............................ | 707/5 |
| 7,251,637 B1 * | 7/2007 | Caid et al. | ..................... | 706/15 |
| 7,272,593 B1 * | 9/2007 | Castelli et al. | .................. | 707/3 |
| 2006/0053122 A1 * | 3/2006 | Korn et al. | ................... | 707/100 |
| 2006/0101060 A1 * | 5/2006 | Li et al. | ...................... | 707/102 |
| 2006/0190465 A1 | 8/2006 | Nakano | | |
| 2006/0218123 A1 * | 9/2006 | Chowdhuri et al. | ............ | 707/2 |
| 2007/0217676 A1 * | 9/2007 | Grauman et al. | ............ | 382/170 |

OTHER PUBLICATIONS

Shim, K.; Srikant, R.; Agrawal, R., "High-dimensional similarity joins," Knowledge and Data Engineering, IEEE Transactions on, vol. 14, No. 1, pp. 156-171, Jan./Feb. 2002 URL: http://ieeexplore.ieee. org/iel5/69/21112/00979979.pdf?isnumber=21112•=STD& arnumber=979979&arnumber=979979&arSt=156&ared=171& arAuthor=Shim%2C+K.%3B+Srikant%2C+R. %3B+Agrawal%2C+R.

Tolga Bozkaya, Meral Ozsoyoglu, "Indexing large metric spaces for similarity search queries," ACM transactions on database systems (TODS), 24(3), Sep. 1999, pp. 1-34.

V. Dohnal, C. Gennaro, and P. Zezula, "A metric index for approximate text management," Proceedings of informmation systems and databases conference, Sep. 2002, pp. 367-095.

E.F. Codd, "A relational model for large shared data banks," originally published Jun. 1970, reprinted in Communications of the ACM, Jan. 2983, 26(1), pp. 377-387.

Christian Bohm, et.al., "High performance clustering based on the similarity join," Conference on information and knowledge management, 2002, pp. 298-305.

David A. Grossman, Ophir Frieder, Information Retrieval: Algorithms and Heuristics, Springer, 2nd ed. 2004, pp. 13-15.

S. Brin. Near neighbor search in large metric spaces. in Proc. VLDB'95, pp. 574-584, 1995. http://citeseer.ist.psu.edu/article/brin95near.html.

* cited by examiner

*Primary Examiner*—Tim T. Vo
*Assistant Examiner*—Dangelino N Gortayo
(74) *Attorney, Agent, or Firm*—Heimlich Law, PC; Alan Heimlich, Esq.

(57) ABSTRACT

A method and apparatus for fast similarity-based query, self-join, and join for massive, high-dimension datasets have been disclosed.

10 Claims, 8 Drawing Sheets

Fig. 4

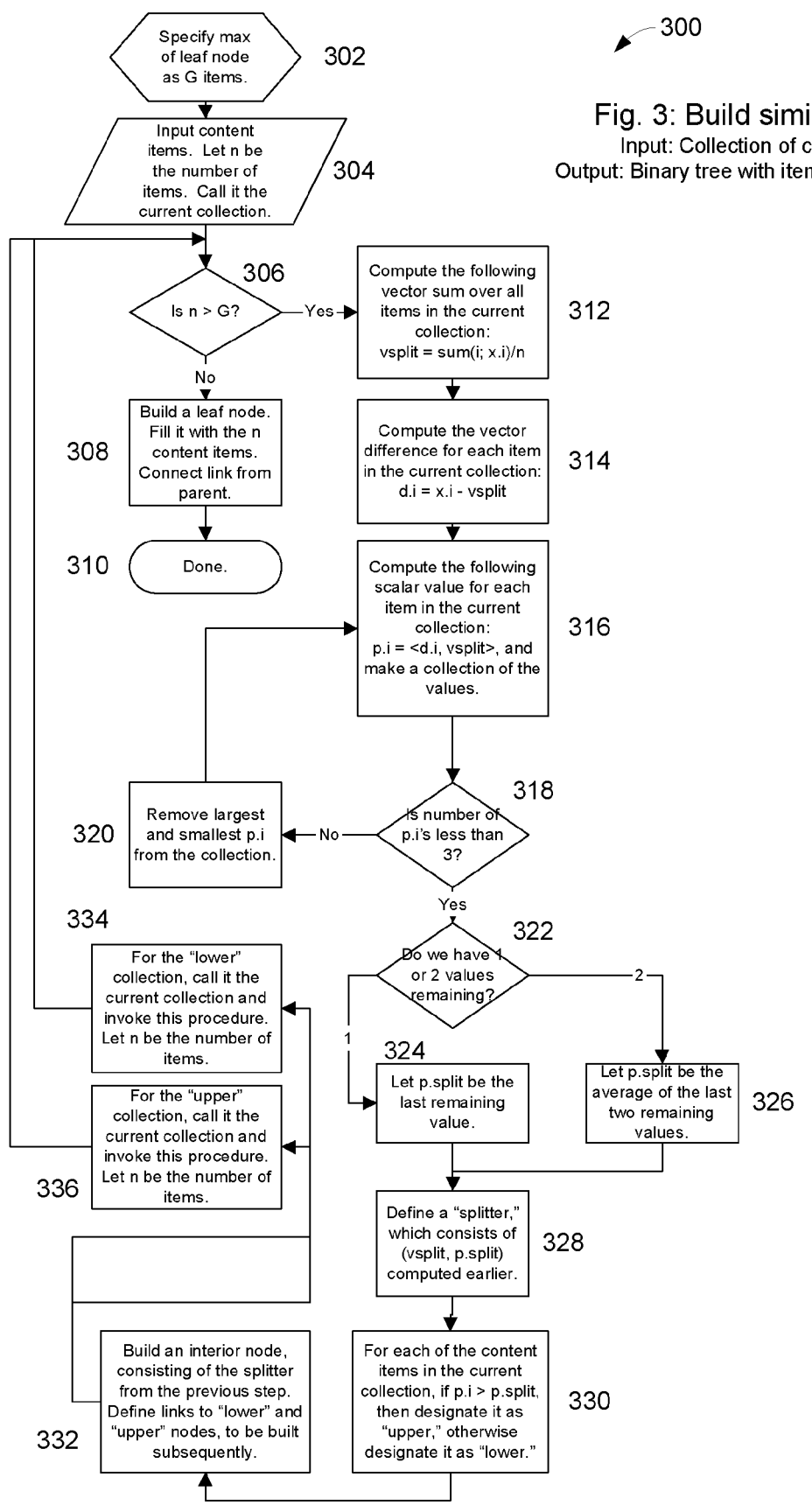
Fig. 3: Build similarity index
Input: Collection of content items
Output: Binary tree with items in the leaf nodes

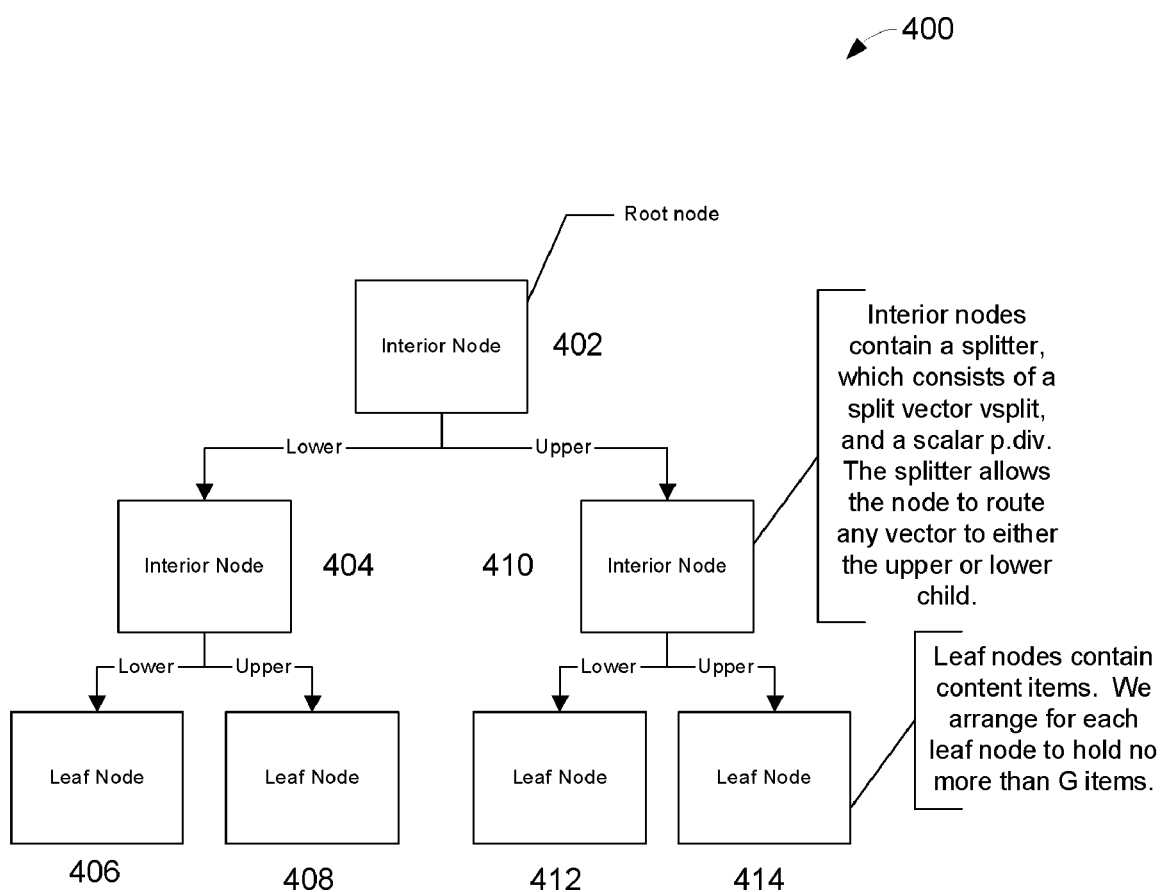
Fig. 4: Example of similarity index

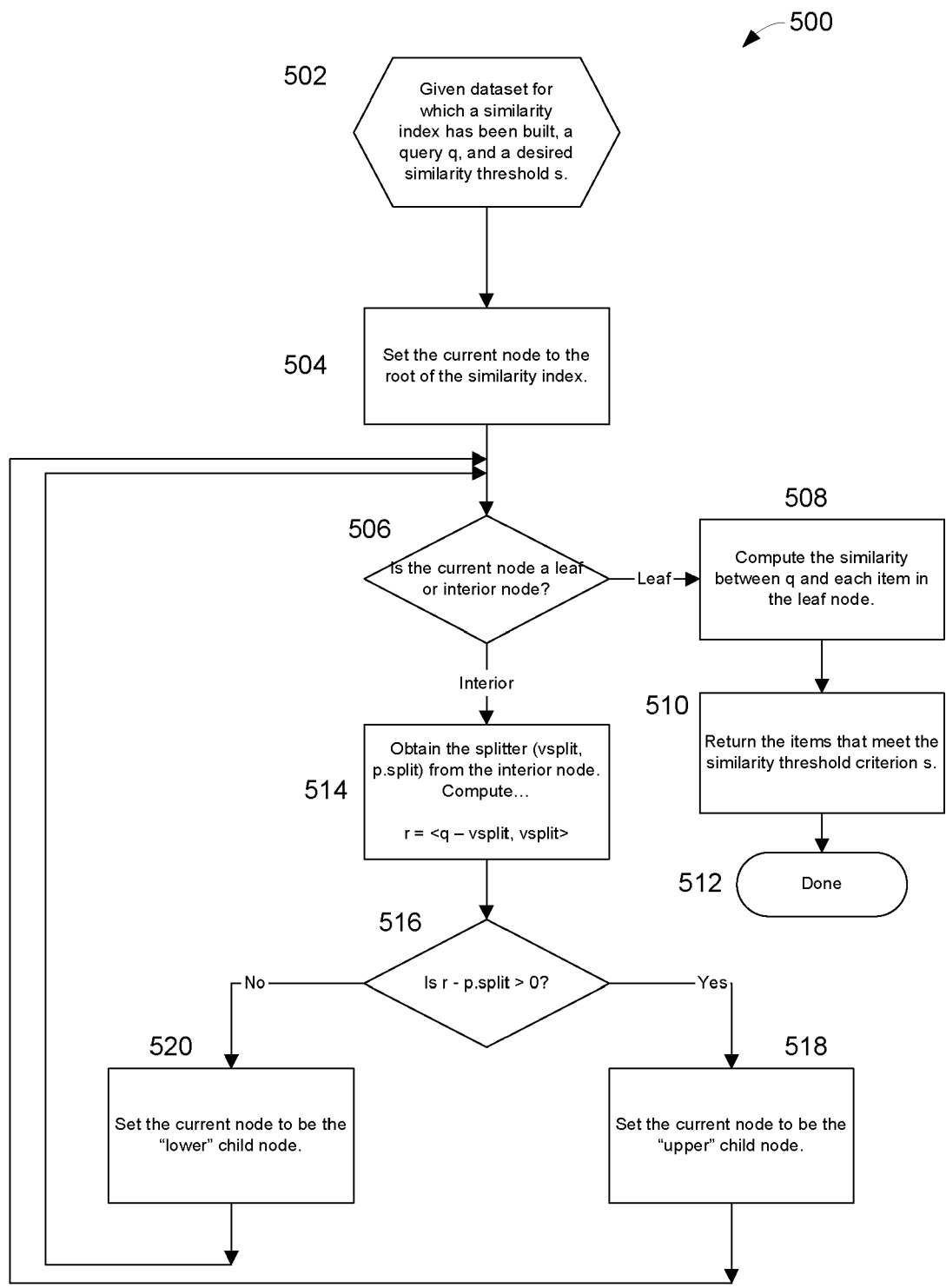
Fig. 5: Query
Input: Query q, Similarity index, Threshold s.
Output: Items that match query to at least threshold s.

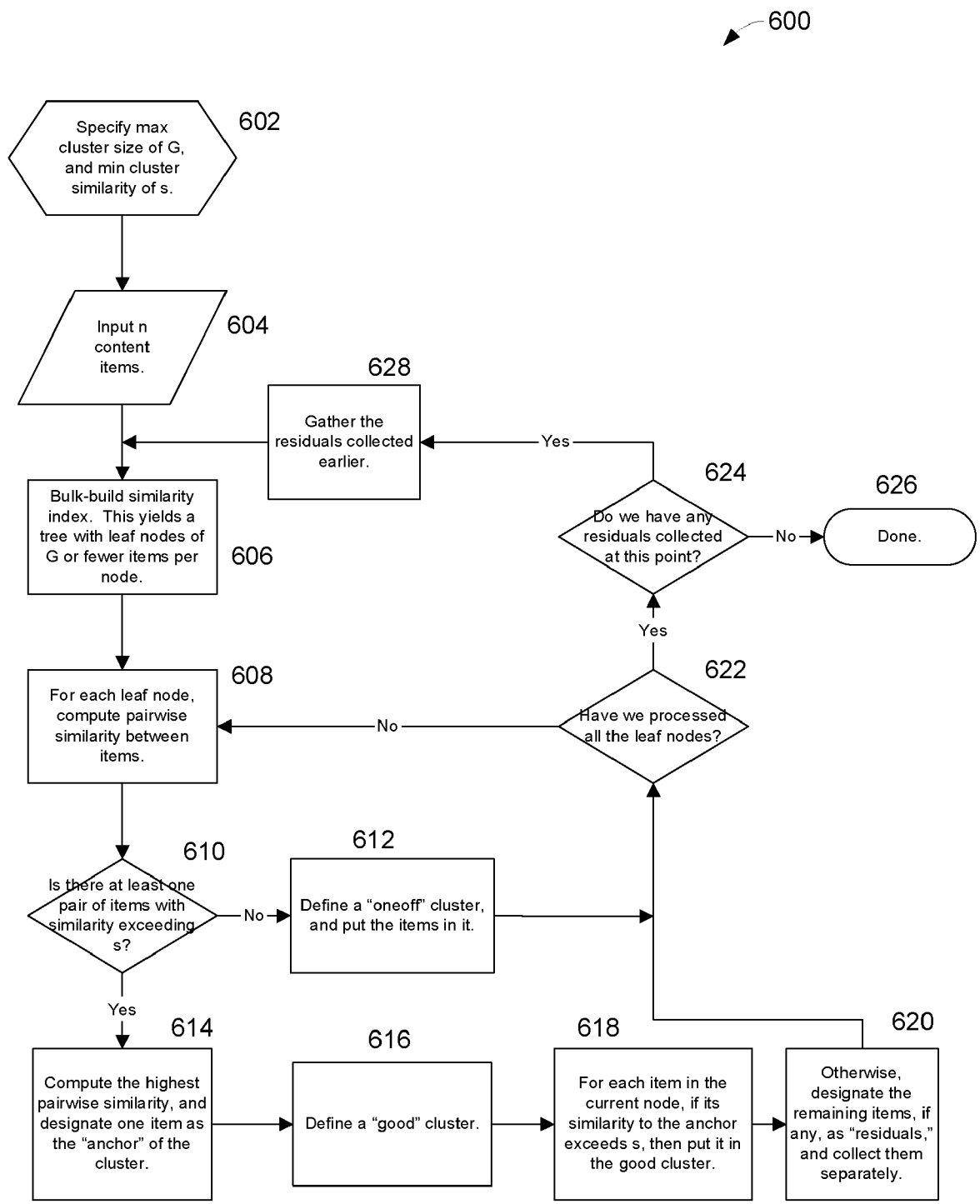
Fig. 6: Self-join
Input: Collection of content items
Output: "Good" and "Oneoff" clusters of items.

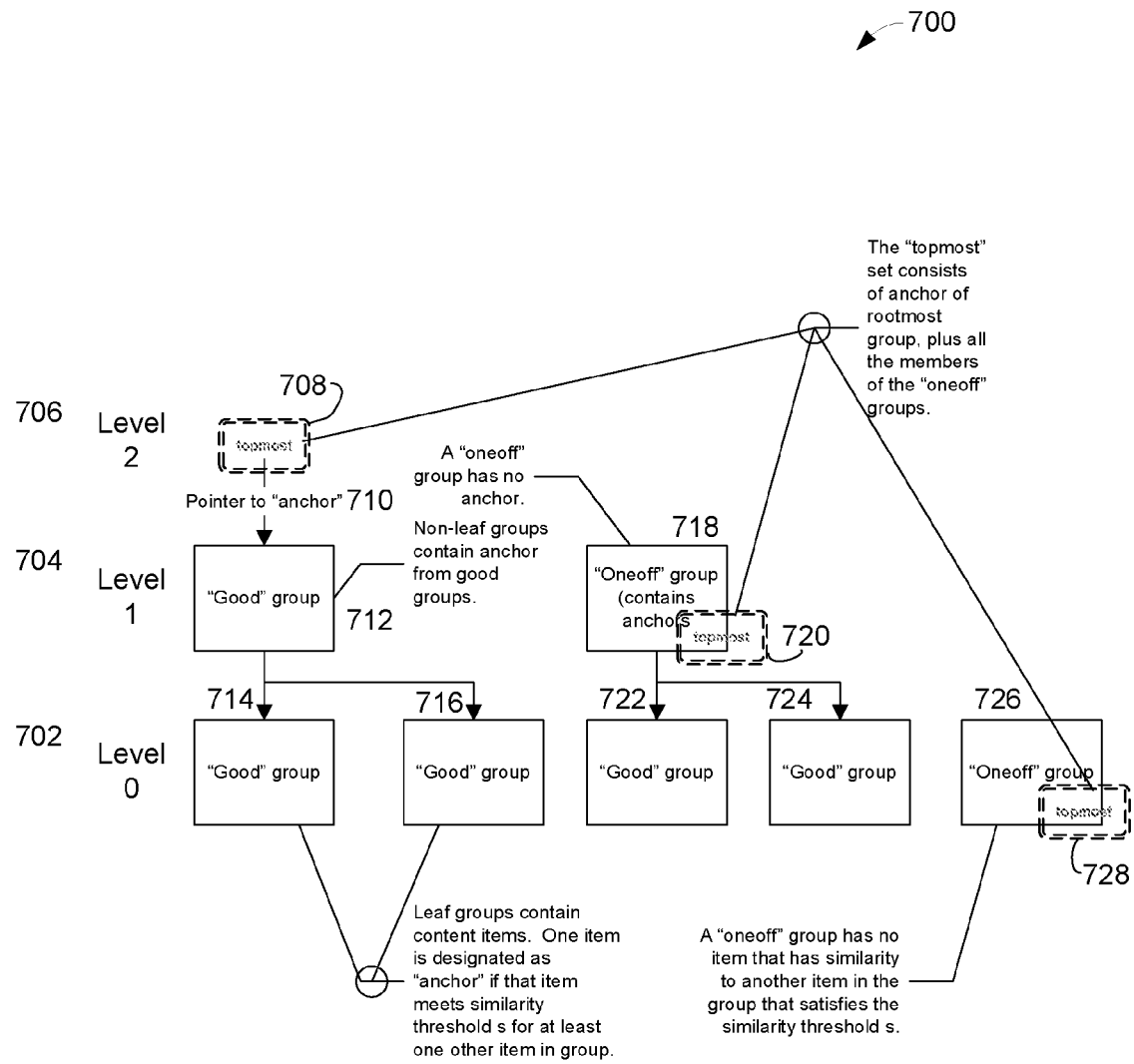
Fig. 7: Example of self-join tree

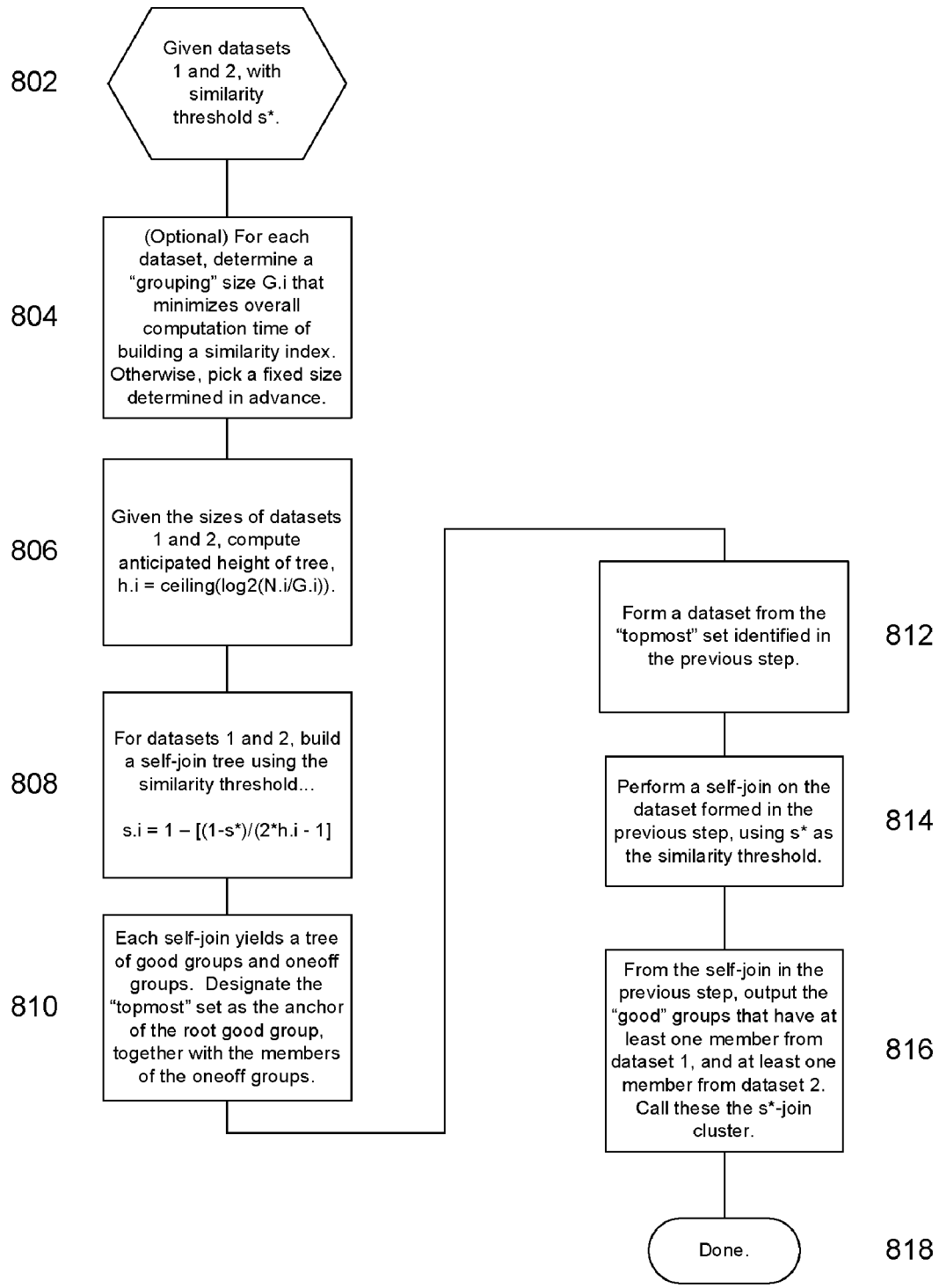
Fig. 8: General join
Input: Collection of content items
Output: "s-Join" clusters of items.

METHOD AND APPARATUS FOR FAST SIMILARITY-BASED QUERY, SELF-JOIN, AND JOIN FOR MASSIVE, HIGH-DIMENSION DATASETS

RELATED APPLICATION

This patent application claims priority of U.S. Provisional Application Ser. No. 60/805,926 filed 27 Jun. 2006 titled "Method and Apparatus for fast similarity-based query, self-join, and join for massive, high-dimension datasets", which is hereby incorporated herein by reference.

FIELD OF THE INVENTION

The present invention pertains to datasets. More particularly, the present invention relates to a method and apparatus for fast similarity-based query, self-join, and join for massive, high-dimension datasets.

BACKGROUND OF THE INVENTION

Joining massive datasets based on similarity rests at the core of many important problems. For example, one important problem within the field of information retrieval is data mining, which seeks to identify patterns between collection of items, such as, documents, images, or other unstructured content. Generally there is some criterion to measure similarity between data members, which can be expressed as a mathematical formula. In general, we have two massive datasets, and we want to "join" the datasets to identify pairs or clusters where there is at least one member from each dataset that is similar to another member from the other dataset. An important special case is the "self-join" where duplicate, near-duplicate, or very similar items within a single dataset are identified. An important application is the emerging areas of content-addressable storage and intelligent file storage, where a target dataset is joined, either against a reference collection, or against itself to identify duplicates and near-duplicates. Although computers become faster, storage more expansive, and content more varied, our ability to make effective sense of massive datasets has not kept pace. This presents a problem.

BRIEF DESCRIPTION OF THE DRAWINGS

The invention is illustrated by way of example and not limitation in the figures of the accompanying drawings in which:

FIG. 3 illustrates one embodiment of the invention showing building a bulk similarity index;

FIG. 4 illustrates one embodiment of the invention showing an example of a similarity index tree;

FIG. 5 illustrates one embodiment of the invention showing a query;

FIG. 6 illustrates one embodiment of the invention showing a self-join;

FIG. 7 illustrates one embodiment of the invention showing an example of a self-join tree; and FIG. 8 illustrates one embodiment of the invention showing a general join.

DETAILED DESCRIPTION

Introduction

Figure 1:
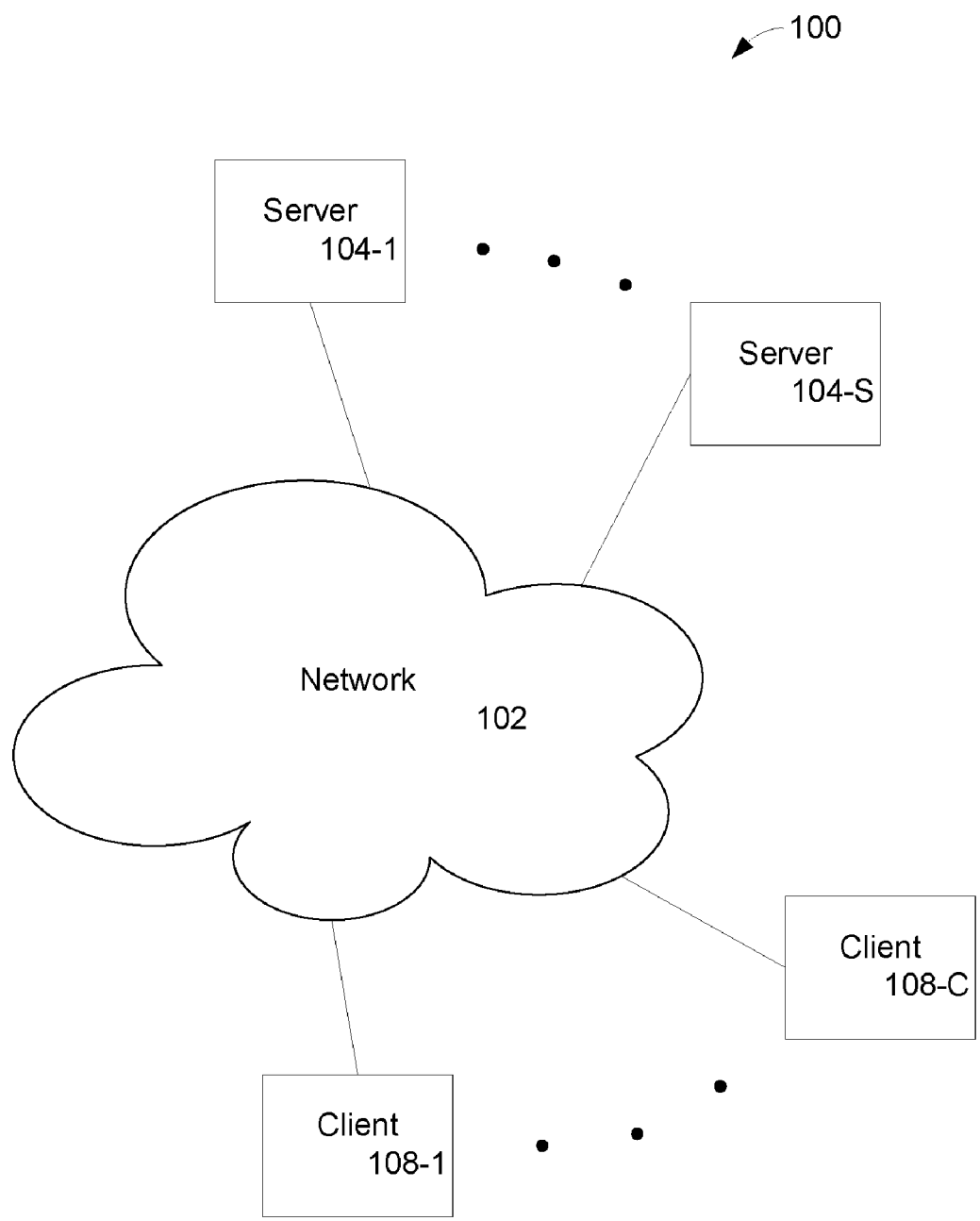
FIG. 1 illustrates a network environment in which the method and apparatus of the invention may be implemented.

For purposes of describing the present invention, the following may assist the reader. An unstructured content item is a unit of information, such as text, image, audio, video, genomic sequence, or any entity that can be represented by bits in computer storage. A dataset is a collection of unstructured content items. Generally the items in a dataset either have, or are believed to have, some relationship. For instance, they may be still images from a photo collection, or the items in a dataset may be paragraphs from a legal document or from a novel. As a side note, we point out that we may insert items in a dataset when we want to explore whether or not the items have a relationship, such as when we assemble snippets of DNA sequences from a wide array of different species, or frames from a surveillance video.

Representing Unstructured Content as Vectors

Formally we denote a content item x as an element from an inner product space, which we will also refer to as a vector space. Furthermore, we will sometimes refer to content item as a vector from this vector space. As a quick review, an inner product space S has the properties listed in the Appendix 1. We used the properties of an inner product space in a previous application [reference R. Nakano, "Method and apparatus for efficient indexed storage for unstructured content", U.S. patent application Ser. No. 11/361,166 dated February 2005.].

An inner produce space has a distance function $D(x, y)$ that expresses as a real number the distance between two elements in the space. This is very important for us because we are interested in how similar or dissimilar two content items are. For example, we might be interested in the internal structural similarity of two web pages, to most efficiently express logic to extract content from a large collection of pages. Or we may want to identify duplicate and near-duplicate text items within a knowledge base of corporate policy statements, or within a repository of legal clauses.

We distinguish between a content item and its concrete representation in our chosen inner product space. For example, in text applications we may choose a representation of text that assigns each word in a given sequence to a token. One tokenization strategy is to "stem" a word so that plural and other different word endings are assigned to the same token. Or, we may decide that numerical quantities map to the same token, so that "3 bears" and "100 bears" are equivalent, namely a quantity, followed by the token for "bear." In terms of the vector representation, two vectors may be equal, but the underlying content items may be different. Another example measures document similarity, which involves representing a document by the keywords that occur within the document, and the number of occurrences of each keyword. This is the term document vector. With this representation text sequences such as, "like an arrow" and "an arrow like" contain one occurrence each of the keywords, "arrow" and "like." Their vectors are equal, and hence they are equal in the vector space sense. But the underlying content items are distinct. We introduce this distinction because we use the vector space representations of members of a dataset, but we allow content items to maintain their underlying identity. In fact, we may choose to introduce a variety of vector representations for a single item.

Inner Product, Distance, Similarity

For our purpose, we will assume that we have chosen a representation, which maps a content item to a vector. Specifically, given a collection of content items, we choose a representation that assigns each item to a vector x in an inner product space S. Given two elements x, y in S, we denote the inner product as <x,y>. Appendix 1 summarizes the properties of an inner product space.

$$\text{Distance } d(x,y)=sqrt(<x-y,x-y>).$$

From this definition, we see that if two vectors x and y are equal, then the distance between them is also zero. Keep in mind that we allow two vectors to be equal, but the corresponding content items may not be identical.

Having an inner product is handy because it gives us a way of expressing the similarity of two items in a dataset. When we have two content items whose corresponding vector representations are non-zero, we introduce the notion of similarity:

$$\text{Similarity}(x,y)=<x,y>/sqrt(<x,x>*<y,y>).$$

Similarity is a useful concept because the similarity is a number between 0 and 1. Two vectors have similarity of one, or 100% similarity, when the distance between them is zero.

Similarity is appealing because it is simple to understand. Given a family of data objects, there may be a mathematical way to express similarity that is simple to grasp, straightforward to compute, and most important, jibes with people's intuition about the degree that two objects are similar.

In practice however, applying similarity to large datasets becomes problematic. Suppose a dataset contains N items, and we want to find items within the dataset that are similar.

When the dimension of vector space S is small, for example, in the one-dimensional case, the vector space reduces to a strictly ordered collection, and we can sort the dataset in $O(n*log(n))$ time, and simply compute the similarity a restricted set of neighboring items within the ordered set.

For most interesting unstructured content datasets, the dimensionality is high. For example, in the term document representation, the dimensionality of the vector space is equal to the number of possible keywords, which can easily range into the hundreds or more. Beyond simple keyword approaches, more sophisticated representations may use word sequences within documents. In those situations, the dimension of the vector space is proportional to the number of distinct n-grams of adjacent words, and the dimensionality extends into the tens of thousands.

For genomic sequence datasets, it is common to consider n-grams of 16 consecutive nucleotides, of which there are 4 possible choices at each location in the n-gram. In general, if a dataset consists of nucleotide sequences of length k, the theoretical dimension of the vector space is roughly $k^4{}^16$, or k raised to the 4 billionth power. Bearing in mind that a sequence of several hundred nucleotides is considered short, we are dealing with problems of huge dimension.

DEFINITIONS

For purposes of describing the present invention, the following definition of terms (in parentheses) may assist the reader.

(Conformable) We say that a collection of items x.i, and the set x.i are conformable when their vector representations are members of a vector space S, and there is an inner product for the space S.

For example, suppose that we have two datasets, both consisting of still images. Furthermore, we have chosen to apply the same transformation on both datasets, specifically to normalize the pixel values for brightness, contrast, scale, and orientation, to yield a high-dimension vector for each image. We want to know whether there are images that are similar, say in pairs of images, or clusters of mutually similar images. By this construction, we say that the datasets are conformable.

(s-Cluster) We say that a conformable collection of items form an s-cluster when for any item x in the collection, has a similarity greater or equal to s, for an item in the collection.

(Self-join) Given a dataset D, identify s-clusters in D, where s is a similarity threshold between 0 and 1.

(Query) Given an item q, a dataset D, and a similarity threshold s between 0 and 1, where q is conformable to D. Considering the union of q and D, identify any s-clusters in that union that includes q.

(s-Join Cluster) Given vectors x.i in dataset D.1, and vectors y.i in dataset D.2, where D.1 and D.1 are conformable. An s-join cluster is an s-cluster where there is at least one member from D.1 and one member from D.2.

(General join) Given vectors x.i in dataset D.1, and vectors y.i in dataset D.2 where D.1 and D.1 are conformable. Identify all s-join clusters.

Embodiments

We will proceed to discuss in the following order various embodiments of the present invention.

First, we show how to build a similarity index.

Second, we show how to perform a similarity-based query against the similarity index.

Third, we show a fast technique to perform a self-join. The algorithm is considered fast because the computational complexity of our approach grows as $O(n*log(n))$. By contrast a brute force approach considers all possible pairs within the dataset, requiring $n*(n-1)/2$ similarity computations, or $O(n^2)$ operations.

Fourth, we show how to perform a general join on two datasets. This procedure uses the self-join technique as a sub-procedure, and it also has computational complexity of $O(n1*log(n1+n2*log(n2))$ operations, where n1 and n2 are the sizes of the two datasets. We note that the procedure that we will describe is better than constructing the union of the two datasets, and performing a self-join on the combined datasets. We prove the correctness of the procedure for the general join.

Building a Similarity Index

A previous description focused on the general case of incremental tree building [reference R. Nakano, "Method and apparatus for efficient indexed storage for unstructured content", U.S. patent application Ser. No. 11/361,166 dated February 2005.]. For our purpose here, we introduce a procedure to bulk build a binary similarity index tree, which is both simpler and faster than the earlier incremental procedure. The initial loading of a dataset is a sufficiently common operation that it makes sense to optimize for that situation.

FIG. 3 illustrates, generally at 300, one embodiment of the invention showing building a bulk similarity index. At 302 we specify a maximum of leaf node as G items. At 302 we input content items, letting n represent the number of items, and calling the items the current collection. At 306 we check to see if n>G. If n>G is not then we proceed to 308 where we build a leaf node, fill it with the n content items, and connect a link from a parent, and then proceed to 310 being done. If n>G is true then we proceed to 312 where we compute the following vector sum over all items in the current collection: vsplit=sum (i; x.i)/n. We then proceed to 314 where we compute the vector difference for each item in the current collection:

d.i=x.i−vsplit. We next proceed to 316 where we compute the following scalar value for each item in the current collection: p.i=<d.i, vsplit>, and make a collection of the values. Next at 318 we check to see if the number of p.i's less than 3. If the number of p.i's is not less than 3 then at 320 we remove the largest and the smallest p.i from the collection and then return to 316. If the number of p.i's is less than 3, then at 322 we check to see if we have 1 or 2 values remaining. If we have 1 value remaining then at 324 we let p.split be the last remaining value and then proceed to 328. If we have 2 values remaining then at 326 we let p.split be the average of the last two remaining values and then proceed to 328. At 328 we define a "splitter," which consists of (vsplit, p.split) which was computed earlier (vsplit at 312, and p.split at 324 or 326). At 330 for each of the content items in the current collection, if p.i>p.split, then designate it as "upper," otherwise designate it as "lower." Next at 332 we build an interior node, consisting of the splitter from the previous step and define links to "lower" and "upper" nodes, which are to be built subsequently. Next depending upon the classification as "lower" or "upper" we go to 334 or 336 respectively. At 334 for the "lower" collection, we call it the current collection, we let n be the number of items, and we invoke this whole procedure again by going to 306. At 336 for the "upper" collection, we call it the current collection, we let n be the number of items, and we invoke this whole procedure again by going to 306. Thus FIG. 3 illustrates generally one embodiment of the invention showing an approach to bulk building a similarity index where the input is a collection of content items and the output is a binary tree with items in the leaf nodes.

FIG. 4 illustrates, generally at 400, one embodiment of the invention showing an example of a similarity index tree. Each interior node (such as 402, 404, 410) holds a splitter, which consists of an "average" vector, and a scalar split value. The job of the splitter is to take any input vector, and to decide whether that vector should be directed to the "lower" or "upper" sub-tree. Each leaf node (such as 406, 408, 412, 414) holds content item vectors.

Query

A similarity index tree can be used to perform a query as follows:
1. We are given a query vector q, a similarity index tree, and a similarity threshold s.
2. Set the current node to be the root of the index tree.
3. If the root node is a leaf node, then compute the similarity between q and every item in the leaf node. Return the items that have similarity greater than s. We are done.
4. Otherwise, if the root node is an interior node, the splitter consists of a vector "vsplit" and a scalar value "p.split." Compute the expression, $r=<q-vsplit,vsplit>$ 5. Compute delta=(r−p.split).
6. If delta is greater than zero, then set the current node to be the upper child. Otherwise, set the current node to be the lower child.
7. Go to step 3.

FIG. 5 illustrates, generally at 500, one embodiment of the invention showing a query. At 502 we are given a dataset for which a similarity index has been built, given a query q, and given a desired similarity threshold s. At 504 we set the current node to the root of the similarity index. At 506 we determine if the current node is a leaf or interior node. If the current node is a leaf then at 508 we compute the similarity between q and each item in the leaf node, we then proceed to 510 where we return the items that meet the similarity threshold criterion s, and then proceed to 512 where we are done. If the current node is an interior node then at 514 we obtain the splitter (vsplit, p.split) from the interior node and compute r=<q−vsplit, vsplit>. Next at 516 we determine if r−p.split>0. If r−p.split is greater than zero then at 518 we set the current node to be the "upper" child node and proceed to 506. If r−p.split is not greater than zero then at 520 we set the current node to be the "lower" child node and proceed to 506. Thus FIG. 5 illustrates generally one embodiment of the invention showing an approach to query where the input is a Query q, a Similarity index, a Threshold s, and the output is items that match the query to at least the threshold s.

Self-Join

Performing a self-join makes use of repeated invocations of building a similarity index. See, for example, the flowchart in FIG. 6.

Procedure Suppose there is a dataset D consisting of items x.i, for i=0, . . . , n−1. We define a self-join procedure that outputs a hierarchical grouping of s-clusters.

Given a value of s in (0,1), every item x in D belongs to a cluster C(x) that has the following properties:
 a. For all y in C(x), Similarity(x,y)>s.
 b. There is at least one member of C(x), call it the anchor a, such that the number of members closest to a is greater or equal to the number of members closest to any other member of C(x). (How can this be stated to cover the cases where C(x) is finite, infinite but countable, and infinite and uncountable?).
 c. Every x in D belongs to some cluster C(x).
 d. The set of clusters C(x) for x in D is finite, mutually exclusive.

We note that for a given value of s, there may be more than one way to define clusters that satisfy the properties above. In other words, a set of clusters output by the self-join technique may not be unique, and there may be other ways of grouping the items that also satisfy the desired condition.

FIG. 6 illustrates, generally at 600, one embodiment of the invention showing a self-join. As noted above performing a self-join makes use of repeated invocations of building a similarity index. At 602 we specify a maximum cluster size of G, and a minimum cluster similarity of s. At 604 we Input n content items. At 606 we bulk-build a similarity index, which yields a tree with leaf nodes of G or fewer items per node. At 608 for each leaf node we compute pairwise (also called pair-wise) similarity between items. At 610 we check to see if there is at least one pair of items with similarity exceeding s. If there is not at least one pair of items with similarity exceeding s then at 612 we define a "oneoff" (also called one-off) cluster, and put the items in it, and then proceed to 622. If there is at least one pair of items with similarity exceeding s then at 614 we compute the highest pairwise similarity, and designate one item as the "anchor" of the cluster. Next at 616 we define a "good" cluster. At 618 for each item in the current node, if its similarity to the anchor exceeds s then put it in the good cluster, otherwise if its similarity to the anchor does not exceed s then at 620 designate the remaining items, if any, as "residuals," and collect them separately. At 622 we determine if we have we processed all the leaf nodes. If we have not processed all the leaf nodes then we resume at 608. If we have processed all the leaf nodes then at 624 we check to see if we have any residuals collected at this point. If we do not have any residuals collected at this point then we proceed to 626 where we are done. If we do have any residuals collected at this point then we proceed to 628 where we gather the residuals collected earlier, and then we proceed to 606. Thus FIG. 6 illustrates generally one embodiment of the invention showing an approach to self-join where the input is a Collection of content items, and the output is "Good" and "Oneoff" clusters of items.

FIG. 7 illustrates, generally at 700, one embodiment of the invention showing an example of a self-join tree. Various levels, Level 0 (702), Level 1 (704), and Level 2 (706) are show. A topmost set (708, 720, and 728) is shown. Pointer to "anchor" 710 is shown between topmost 708 and "Good" group 712. Also at 714 and 716 are shown "Good" groups. At 718 is a "oneoff" group which has no anchor. Also at 722 and 724 are shown "Good" groups. 726 shows a "oneoff" group that has no item that has similarity to another item in the group that satisfies the similarity threshold s.

General Join

Give two conformable datasets D.1 and D.2 and a similarity threshold s*, this procedure identifies a collection s*-join clusters. Each s*-join cluster reveals important information about the two datasets, because it identifies which items in one dataset have similar counterparts in the other dataset. Moreover, because the s* parameter is settable by us, we get to determine whether the matches filter out all but the very close matches (s* very close to 1), or whether we are happy to find very broad matches but still screen out the utter mismatches (e.g., using an s* of 70%).

Approach As we mentioned earlier, one of the main challenges with massive datasets is to avoid the n^2 pairwise similarity computation phase as much as possible. For example, during the self-join procedure, we resort to pairwise similarity computation only when we get to the leaf nodes that contain G items each. Because we can control the size of the leaf node G, we can put a bound on the pairwise computation at $G^2/2$.

The idea behind the general join is to leverage as much as possible the partial hierarchy that the self-join procedure produces. When there is a high degree of internal similarity within a dataset, there will be many "good" groups. Refer to FIG. 7. Each good group anoints an "anchor" item from its midst to represent that group upwards in the group hierarchy. Since each anchor represents G other group members, this leads to a large savings in computational cost, because dissimilarity of an external item against the anchor is equivalent to knowing that the same item would be dissimilar to every member of the group as well.

There is a cost, however, of using this proxy representation scheme for similarity, and that has to do with the anchor being only an imperfect stand-in for each group member. To compensate for this, we must tighten the similarity threshold between levels in the good group hierarchy, to maintain our adherence to the overall s* similarity criterion. In other words, because each level in the self-join grouping hierarchy loses some similarity fidelity, we adjust the threshold used within the self-join to compensate. We compute how much similarity budget we can allow at each level by deriving a "chain rule" for similarity, as follows.

Suppose we have a distance between two items x and z, and we want to introduce an intermediary y:

$$\|x-z\|^2 = \|(x-y)-(y-z)\|^2 <= \|(x-y)\|^2 + \|(y-z)\|^2$$

(Triangle inequality)

If we assume that x, y, and z are normalized to have unit norm, or $<x,x>=<y,y>=<z,z>=1$, we can use the fact that Similarity$(x,y)=<x,y>/\sqrt{<x,x>*<y,y>}=<x,y>$.

Using the definition that $\|x-y\|^2=<x-y, x-y>$, and expanding the second term using the properties of inner product, we arrive at a chain rule for similarity:

$$1-\text{Similarity}(x,z)<=(1-\text{Similarity}(x,y))+(1-\text{Similarity}(y,z)) \quad (*)$$

As an aside, this can be expressed in more memorable terms phrased in terms of dissimilarity, $$\text{Dissimilarity}(x,z)<=\text{Dissimilarity}(x,y)+\text{Dissimilarity}(y,z),$$

where Dissimilarity(x,y)=1−Similarity(x,y).

Rewriting equation (*) above, we get an equivalent chain rule:

$$\text{Similarity}(x,z)<=\text{Similarity}(x,y)+\text{Similarity}(y,z)-1.$$

This can be extended to two intermediaries:

$$\text{Similarity}(x, z) <= \text{Similarity}(x, y1) + \text{Similarity}(y1, y2) + \text{Similarity}(y2, z) - 2.$$

This can be extended to multiple intermediaries, y.i, for i=1,k.

$$\text{Similarity}(x, z) <= \text{Similarity}(x, y.1) + \text{sum}(i = 1, k - 1; \text{Similarity}(y.i, y.i + 1)) + \text{Similarity}(y.k, z) - k.$$

This expression can be interpreted to mean that every time we interpose one additional intermediary between x and z, the lower bound on the similarity between the two endpoints degrades by the similarity between each additional intermediary.

We will use this chain rule to determine what similarity threshold we need to use on each self-join, so that when we try to reason about similarity propagating from leaf nodes in the tree up to the anchor and oneoff nodes, that we have a handle on the loss of fidelity that many levels in the tree introduces to the solution. In our case, we allocate the total similarity budget evenly between levels.

To give an example of the chain rule in action, the following table shows the required "internal" similarity threshold is required, if we need to require that whenever two leaf items are related to one another via some anchor item, that we can assert that in the worst case the two items meet an 85% similarity threshold. As the table indicates, as the tree becomes taller, we need to enforce a greater degree of similarity between levels, in order to maintain an overall similarity guarantee.

| Levels in self-join tree | Internal similarity required to achieve 85% similarity overall |
| --- | --- |
| 1 | 85.00% |
| 2 | 95.00% |
| 3 | 97.00% |

-continued

| Levels in self-join tree | Internal similarity required to achieve 85% similarity overall |
|---|---|
| 4 | 97.86% |
| 5 | 98.33% |
| 6 | 98.64% |

Solution Criterion The specific condition that the general join procedure achieves is that each s*-join cluster has the property that each member of the cluster is at least within the s* similarity threshold to some member of the other dataset. Moreover, if any member of the join cluster is an anchor, then all of the members of that member's dataset that is directly or indirectly reachable through that anchor is at least within the s* similarity threshold to some member of the other dataset. In addition, if a join pair can be constructed from the join cluster, where each member of the pair is an anchor, then the two entire grouping subtrees of each anchor are candidates to meet the s* threshold. Conversely, if there is an item x.1 from D.1 and x.2 from D.2, and Similarity(x.1, x.2)>s*, then the solution from a general join contains an s*-join cluster where either a) x.1 and x.2 both are members, or b) there is an anchor which is a member of the s*-join cluster, where x.1 and/or x.2 are directly or indirectly reachable through that anchor.

Procedure

1. We are given a similarity threshold s*.
2. Let the size of datasets 1 and 2 be N1 and N2, respectively.
3. Pick a grouping size G1>0. (We want G to be large enough that the anticipated size of the hierarchical self-join tree is manageable, but where G is small enough that the G1^2/2 pairwise similarity computations is kept bounded. We compute an optimal grouping size that minimizes the total computational cost of computing pairwise similarities, plus the cost of computing the upper/lower splits required of building the self-join binary tree.) The choice of grouping size G1 determines the height of the binary tree, according to height h1=ceiling(log 2(N1/G1)).
4. Pick a similarity threshold s1 for dataset 1 as follows. Using the anticipated height of the self-join tree h1, compute the "internal" similarity s1 as, s1=1−(1−s*)/(2*h1−1)

This is the similarity we need to use when constructing the self-join tree on dataset1, to assure that taking into account the full height of the tree that the similarity of each anchor to its group is sufficiently close that all candidate join pairs are preserved.
5. Do the same for dataset 2. Namely, pick a grouping size G2, height h2, and internal similarity threshold s2.
6. Compute a self-join for each dataset, using the grouping size and the internal similarity threshold determined earlier.
7. Identify the topmost elements of the self-join tree of each dataset, which consists of the anchor of the root cluster, plus the members of all the oneoff groups.
8. Combine the topmost elements of the self-join tree from dataset 1 and 2 into a single collection, and compute a self-join on this collection using a similarity threshold of s* and an optimal grouping size, corresponding to the number of items in this collection.
9. Go through the clusters that result from the self-join, and select all the join clusters for a similarity threshold of s*. Add each selected join cluster to the result set.
10. Interpret the results of the join as follows. Recalling the definition of a s*-join cluster, each such cluster contains at least one member from datasets 1 and 2. The members of the cluster satisfy the s* similarity threshold condition. Furthermore, some members of the cluster are anchors in the self-join performed on its own dataset in step 6 above. In that case, we say that members of its dataset that are directly or indirectly reachable through the anchor are part of the join set. In particular, in the case that the join cluster contains anchors a1 and a2 from dataset 1 and 2, respectively, then members of dataset 1 that are reachable from anchor a1 are revealed to be joined to members of dataset 2 that are reachable from anchor a2.

Refer to the flowchart in FIG. 8.

FIG. 8 illustrates, generally at 800, one embodiment of the invention showing a general join. At 802 we given datasets 1 and 2, with similarity threshold s*. At 804 we can pick a fixed "grouping" size G.i determined in advance, or optionally for each dataset, determine a "grouping" size G.i that minimizes overall computation time of building a similarity index. Next at 806 given the sizes of datasets 1 and 2, we compute the anticipated height of tree, h.i=ceiling(log 2(N.i/G.i)). At 808 for datasets 1 and 2, we build a self-join tree using the similarity threshold s.i=1−[(1−s*)/(2*h.i−1]. Next at 810, each self-join yields a tree of good groups and oneoff groups, and we designate the "topmost" set as the anchor of the root good group, together with the members of the oneoff groups. At 812 we form a dataset from the "topmost" set identified in the previous step (810). Next at 814 we perform a self-join on the dataset formed in the previous step (812), using s* as the similarity threshold. Now at 816, from the self-join in the previous step (814), we output the "good" groups that have at least one member from dataset 1, and at least one member from dataset 2, and call these the s*-join cluster. We next proceed to 818 where we are done. Thus FIG. 8 illustrates generally one embodiment of the invention showing an approach to a general join where the input is a Collection of content items, and the output is "s-Join" clusters of items.

Proof of Correctness

The correctness of the general join algorithm requires that for x.1 in dataset 1 and x.2 in dataset 2, x.1 and x.2 are either a) identified as paired in the result set or b) one or both of x.1 and x.2 are represented by an anchor within their self-join trees and their representatives directly appear or a indirectly connected in the result set, if and only if Similarity(x.1, x.2)>s.0.

From the construction of the result set, we know that any pairs selected for the result set satisfy Similarity(x.1, x.2)>s.0. This establishes the part a) of the "only-if" direction.

To establish the part b) of the "only-if" direction, we note that we constructed the self-join trees for D.1 and D.2 so that the lower bound of the total similarity from a topmost anchor or oneoff item to any item in the tree below it, is s*. In other words, we took into account the distances from any item to its anchor, and summed up the total dissimilarity based on the height of the tree, to assure that any connected pairs of items within the tree would be at least similarity s*. With the total similarity within each self-join tree accounted for, we only need to consider the additional similarity any other member in the s*-join clusters, resulting from the anchor to either another anchor, or to an item directly. This additional distance may lead to elimination of some possible pairing in the final solution.

For the "if" direction of the proof, suppose to the contrary that there exist x.1 and x.2, where x.1 and x.2 are from datasets 1 and 2, respectively, where Similarity(x.1,x.2)>s.0, and furthermore where x.1 and x.2 are not represented in the result set. In other words, there is a pair of matching items from the datasets where we failed to identify that match, either by their direct presence in the result set, or via a representative anchor in the result set. We want to establish a contradiction.

This means that we have the situation that either one or both of x.1 and x.2 do not end up in the result set, and neither do any of their anchors upward in the self-join tree, at any time during the join algorithm. We will proceed by induction.

For the base case, suppose that x.1 is either a topmost anchor, or it appeared in one of the oneoff groups. Suppose the same is true for x.2. The first step of the join algorithm combines all topmost anchors and oneoff members of both datasets into a single collection, and performs a self-join on it, using the s* threshold. Any cluster that contains at least one member from each of datasets 1 and 2 are identified for further processing; we will call this a s*-join cluster. But this leads to a contradiction, because we have the case that x.1 and x.2 are in the topmost set, and they satisfy the s* condition, but in that case the self-join procedure puts them into the result collection.

For the inductive case, suppose that x.1 is neither the topmost anchor, nor is in a oneoff group. This implies that it is in a group that contains an anchor. And in turn, each anchor is either in a oneoff group, or it also is in a group with an anchor. By construction of the self-join tree, we know that the similarity of x.1 to the topmost anchor, or to a oneoff group member, is at least s*.

The same reasoning applies to x.2. From this we know that x.1 and x.2 have representatives in the topmost set that satisfy the s* condition. But we formed an s*-join cluster of the topmost items from D.1 and D.2 during the procedure. Hence the only way for us to not have directly formed a group with representatives for x.1 and x.2 would be if the representatives got separated into different groups not connected by a common anchor. But this contradicts the properties of the self-join.

Therefore, we have established both the "if" and "only-if" directions of the proof.

DISCUSSION

We observe that the work in performing a join between two datasets occurs in two parts. First, we do a self-join on each dataset individually. Second, we do a self-join on the topmost elements of each dataset. In practice we see that when a dataset has a significant degree of similarity within itself, then the topmost set can be significantly smaller than the entire dataset, because the anchors stand in as proxies for the respective group members. When both datasets have a high degree of internal similarity, then the number of topmost members will be relatively small, and the self-join on the combined topmost sets will be relatively quick.

On the other hand, when a dataset contains very little similarity within itself, then the self-join produces a large number of oneoff groups, with few anchors. In this case the topmost members will be almost as large as the entire dataset. If the same is true about the second dataset, we see that the self-join on the topmost set will constitute the bulk of the work.

We point out that this procedure for joining two datasets can be extended to joining multiple datasets. First, produce self-joins on each dataset individually. Second, collect the topmost members from each self-join into a combined set of topmost members, and perform a self-join on that set.

In practice it makes sense to incrementally update the similarity index for a dataset when items are added or removed, because a self-join is a prerequisite to joins with other datasets, and in turn a similarity index is a necessary component of a self-join. The procedure described in reference R. Nakano, "Method and apparatus for efficient indexed storage for unstructured content", U.S. patent application Ser. No. 11/361,166 dated February 2005 is applicable in this case.

"Group" and "Cluster"

One of skill in the art will appreciate that often several terms are used to describe the same thing. As used in this description, the terms "group" and "cluster" or similar phrases are used to refer to the same thing. For example, in Definitions section above we defined s-Cluster thusly: (s-Cluster) We say that a conformable collection of items form an s-cluster when for any item x in the collection, has a similarity greater or equal to s, for an item in the collection. The word "cluster" refers to a collection of "items," elsewhere referred to as "content items." By saying that they are in a "cluster" emphasizes the point that the all the elements in the cluster have pairwise similarity of s or greater. For example, if the similarity threshold s is say, 99%, we may have 10 images p1, . . . , p.10, and after being suitably converted into their respective inner-product space vectors, that similarity (p.i, p.j)>=0.99, for all i and j in $\{1, \ldots, 10\}$.

Another example is in the discussion of Self-join section where we state: Given a value of s in (0,1), every item x in D belongs to a cluster C(x) that has the following properties: . . . . Here the word "cluster" refers to the same thing. So continuing the example above, there is a value s=0.99, where every image x in the collection of images has the property that the images are pairwise similar that meets or exceeds the 99% threshold.

Another example is discussion about groups, such as in FIG. 8 where is disclosed "Each self-join yields a tree of good groups and oneoff groups." Here, the self-join operation is described to produce good groups and one-off groups. This is the same as saying that a good group is an s-cluster satisfying the similarity threshold s. A one-off group is a set of content items that fails to meet the s threshold. For example, if we have set s to be 99%, then a good group is a 0.99-cluster. But a one-off group is a collection that fails the criterion to satisfy the 0.99-cluster condition. If the similarity threshold condition holds we can use the terms, "good cluster," "good cluster," and "s-cluster" to mean the same thing. Otherwise, if the similarity condition does not hold, we can use the terms, "one-off group" and "one-off cluster" or similar phrases to mean the same thing.

From this we see that "group" and "cluster" (and similar phrases) refer to a set of content items that have some known pairwise similarity values. Because we know this, we can make statements about whether a given similarity threshold s has been achieved or not. In particular, if all pairs of content items exceed s similarity, we have an s-cluster, a good group, or a good cluster. Otherwise, we do not have an s-cluster, but instead we have a one-off group or a one-off cluster.

Parenthetically, note that if we have n content items and we do not know the pairwise similarity values, all $n*(n-1)/2$ of them, then we cannot say whether they constitute a good group, one-off group, good cluster, one-off cluster, or s-cluster. In the degenerate case, any n items form a 0-cluster. In other words, any pair of content items has similarity >=0, which is true but doesn't help us.

Quod Erat Demonstrandum

We have shown how to perform similarity-based queries, self-joins, and general joins for massive, high-dimensional datasets.

Thus a method and apparatus for fast similarity-based query, self-join, and join for massive, high-dimension datasets have been described.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or computing device whether local or remote, such as a LAN, a WAN, a system bus, a microprocessor, a mainframe, a server, etc.

Figure 2:
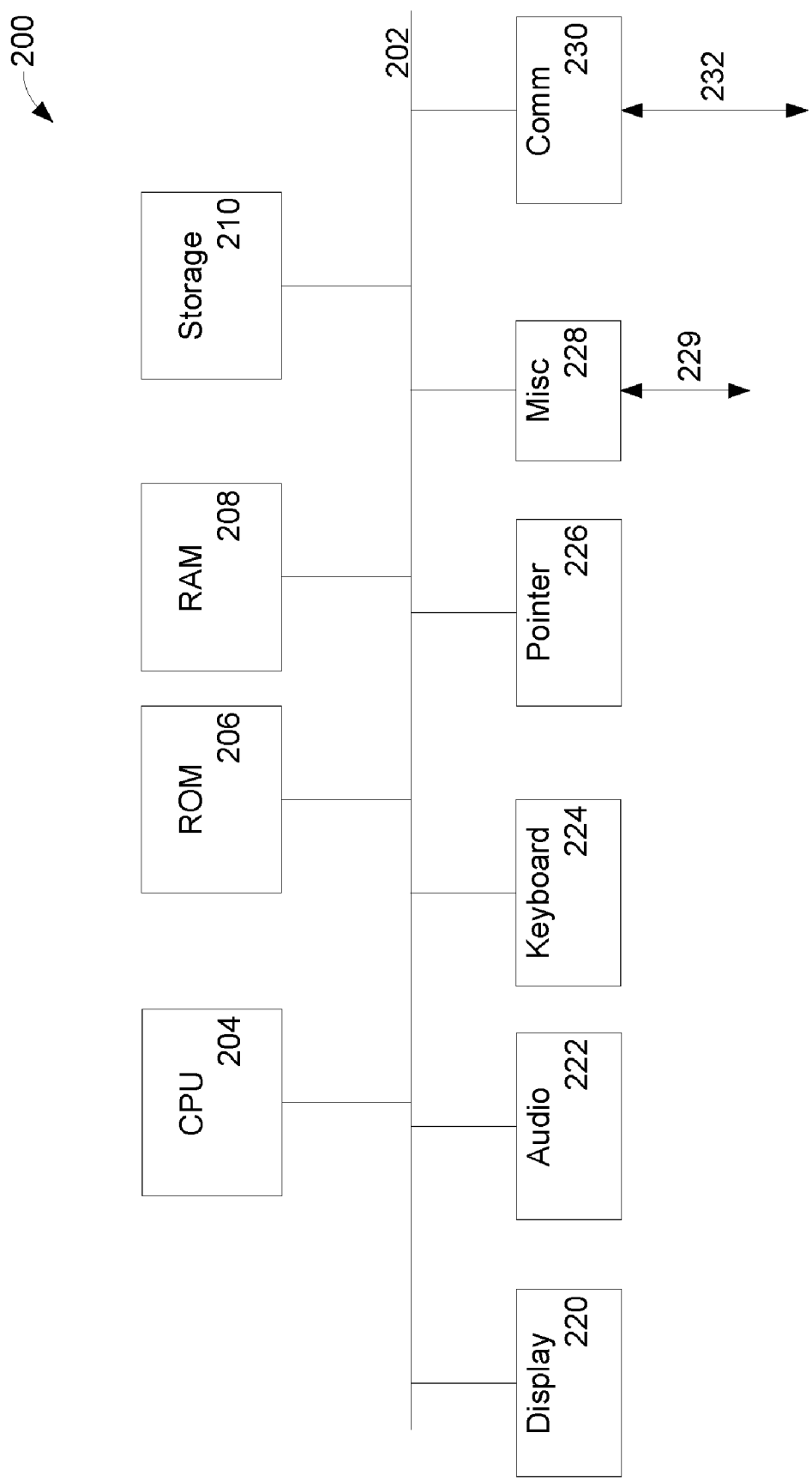
FIG. 2 is a block diagram of a computer system in which may implement some embodiments of the invention and where some embodiments of the invention may be used.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus a method and apparatus for fast similarity-based query, self-join, and join for massive, high-dimension datasets have been described.

APPENDIX 1

(Inner product space) Given any two items x, y in a vector space, there is an inner product that satisfies the following properties:
 a. $<x,x>>=0$
 b. $<x,x>=0$ iff x=0.
 c. $<X,y>=<y,x>$
 d. $<a*x, y>=a*<x,y>$
 e. $<x+y, z>=<x,z>+<y,z>$ The similarity between two non-zero elements x, y can be expressed as, $$\mathrm{Similarity}(x,y)=<x,y>/sqrt(<x,x>*<y,y>).$$

We observe that an inner space is a metric space with the following metric.

$$\|x\|=sqrt(<x,x>).$$

The triangle inequality says that, $$\|x-y\|^2<=\|x\|^2+\|y\|^2$$

What is claimed is:

1. A computer implemented method comprising:
 (a) specifying a maximum of G items per leaf node;
 (b) inputting n distinct input content items and denoting said n distinct input content items as a current collection;
 (c) determining if n>G; and
 (d) if not then
  (d1) building a leaf node;
  (d2) filling said leaf node with said n distinct input content items; and
  (d3) connecting a link from a parent to said leaf node capable of being stored in hardware on said computer and capable of being displayed to a user.
 (e) if yes then
  (e1) computing a vector sum over all items in said current collection, wherein said vector sum is denoted vsplit, and vsplit=sum(i; x.i)/n, where i denotes an index (i=1, . . . , n) and x.i denotes a vector at index i;
  (e2) computing a vector difference for each item in said current collection, wherein said vector difference is denoted as d.i, and d.i=x.i−vsplit;
  (e3) computing a scalar value for each item in said current collection, wherein said scalar value is denoted as p.i, and p.i=<d.i, vsplit> where <.> denotes inner product, and making a collection of said computed scalar value for each item;
  (e4) determining if p.i<3; and
 (f) if not then
  (f1) removing a largest p.i from said collection
  (f2) removing a smallest p.i from said collection; and
  (f3) resuming at (e3)
 (g) if yes then
  (g1) determining if 1 or 2 computed values remain in said collection; and
 (h) if 1 then
  (h1) letting p.split be said 1 computed remaining value; and
  (h2) resuming at (j);

(i) if 2 then
  (i1) letting p.split be an average of said 2 computed remaining values; and
  (i2) resuming at (j);
(j) defining a splitter which consists of said vsplit and said p.split;
(k) denoting for each of said n distinct input content items in said current collection a designation of "upper" if p.i>p.split, otherwise a designation of "lower";
(l) building an interior node, consisting of said splitter, and defining links to said "lower" and said "upper" nodes;
(m) inputting said "lower" nodes as items into a new "lower" current collection, letting new "lower" n denote the number of items in said new "lower" current collection, replacing said current collection with said new "lower" current collection, replacing said n with said new "lower" n, and resuming at (c);
(n) inputting said "upper" nodes as items into a new "upper" current collection, letting new "upper" n denote the number of items in said new "upper" current collection replacing said current collection with said new "upper" current collection, replacing said n with said new "upper" n, and resuming at (c).

2. The computer implemented method of claim 1 further comprising:
(o) specifying a maximum cluster size of G;
(p) specifying a minimum cluster similarity of s;
(q) inputting n distinct content items;
(r) building a bulk similarity index for said n distinct content items, yielding a tree with leaf nodes of G or fewer content items per node;
(s) computing for each leaf node a pairwise similarity between items;
(t) determining if there is at least one pair of items with similarity exceeding s; and
(u) if no then
  (u1) defining a "oneoff" cluster;
  (u2) putting said items in said "oneoff" cluster; and
  (u3) resuming at (w);
(v) if yes then
  (v1) computing a highest pairwise similarity, and designating one item as a "anchor" of a cluster;
  (v2) defining a "good" cluster;
  (v3) placing into said "good" cluster each item in said current node if its similarity to said "anchor" exceeds s, otherwise designate any remaining items as "residuals" and collect them separately;
(w) determining if all leaf nodes have been processed; and
(x) if not then
  (x1) resuming at (s);
(y) if so then
(z) determining if any "residuals" have been collected at this point; and
(aa) if not then
  (aa1) storing in hardware on said computer any "good" cluster and any "oneoff" cluster, said stored any "good" cluster and said stored any "oneoff" cluster capable of being displayed to a user
(ab) if yes then
  (ab1) gathering said "residuals" collected earlier; and
  (ab2) resuming at (q).

3. The computer implemented method of claim 2 further comprising:
(ac) inputting datasets 1 and 2
(ad) inputting a similarity threshold of s*, where $0 \le s^* \le 1$;
(ae) inputting for each said datasets 1 and 2 a "grouping" size G.i, where =1 or 2;
(af) computing, based on datasets 1 and 2 size, an anticipated height of a tree denoted h, and h.i=ceiling(log 2(N.i/G.i)), where i=1 or 2, and N is number of items in dataset i;
(ag) building for datasets 1 and 2 a self-join tree using a similarity threshold, s.i=1−[(1−s*)/(2*h.i−1], yielding a tree of good groups and oneoff groups;
(ah) designating a "topmost" set as an anchor of a root good group, together with members of said oneoff groups;
(ai) forming a dataset from said "topmost" set;
(aj) performing a self-join on said dataset, using said similarity threshold s*;
(ak) outputting from said self-join on said dataset "good" groups that have at least one member from dataset 1, and at least one member from dataset 2 denoting these a s*-join cluster, said s*-join cluster capable of being stored in hardware on said computer and capable of being displayed to a user.

4. The computer implemented method of claim 3 wherein said "grouping" size G.i is determined in advance.

5. The computer implemented method of claim 3 wherein said "grouping" size G.i minimizes overall computation time of building a similarity index.

6. A hardware based apparatus comprising:
(a) means for specifying a maximum of G items per leaf node;
(b) means for inputting n distinct input content items and denoting said n distinct input content items as a current collection;
(c) means for determining if n>G; and
(d) if not then
  (d1) means for building a leaf node;
  (d2) means for filling said leaf node with said n distinct input content items; and
  (d3) means for connecting a link from a parent to said leaf node capable of being stored in a memory and said memory capable of being displayed to a user.
(e) if yes then
  (e1) means for computing a vector sum over all items in said current collection, wherein said vector sum is denoted vsplit, and vsplit=sum(i; x.i)/n, where i denotes an index (i=1, . . . , n) and x.i denotes a vector at index i;
  (e2) means for computing a vector difference for each item in said current collection, wherein said vector difference is denoted as d.i, and d.i=x.i−vsplit;
  (e3) means for computing a scalar value for each item in said current collection, wherein said scalar value is denoted as p.i, and p.i=<d.i, vsplit> where <.> denotes inner product, and making a collection of said computed scalar value for each item;
  (e4) means for determining if p.i<3; and
(f) if not then
  (f1) means for removing a largest p.i from said collection
  (f2) means for removing a smallest p.i from said collection; and
  (f3) means for resuming at (e3)
(g) if yes then
  (g1) means for determining if 1 or 2 computed values remain in said collection; and
(h) if 1 then
  (h1) means for letting p.split be said 1 computed remaining value; and
  (h2) means for resuming at (j);

(i) if 2 then
  (i1) means for letting p.split be an average of said 2 computed remaining values; and
  (i2) means for resuming at (j);
(j) means for defining a splitter which consists of said vsplit and said p.split;
(k) means for denoting for each of said n distinct input content items in said current collection a designation of "upper" if p.i>p.split, otherwise a designation of "lower";
(l) means for building an interior node, consisting of said splitter, and defining links to said "lower" and said "upper" nodes;
(m) means for inputting said "lower" nodes as items into a new "lower" current collection, letting new "lower" n denote the number of items in said new "lower" current collection, replacing said current collection with said new "lower" current collection, replacing said n with said new "lower" n, and resuming at (c);
(n) means for inputting said "upper" nodes as items into a new "upper" current collection, letting new "upper" n denote the number of items in said new "upper" current collection, replacing said current collection with said new "upper" current collection, replacing said n with said new "upper" n, and resuming at (c).

7. The hardware based apparatus of claim 6 further comprising:
(o) means for specifying a maximum cluster size of G;
(p) means for specifying a minimum cluster similarity of s;
(q) means for inputting n distinct content items;
(r) means for building a bulk similarity index for said n distinct content items, yielding a tree with leaf nodes of G or fewer content items per node;
(s) means for computing for each leaf node a pairwise similarity between items;
(t) means for determining if there is at least one pair of items with similarity exceeding s; and
(u) if no then
  (u1) means for defining a "oneoff" cluster;
  (u2) means for putting said items in said "oneoff" cluster; and
  (u3) means for resuming at (w);
(v) if yes then
  (v1) means for computing a highest pairwise similarity, and designating one item as a "anchor" of a cluster;
  (v2) means for defining a "good" cluster;
  (v3) means for placing into said "good" cluster each item in said current node if its similarity to said "anchor" exceeds s, otherwise designate any remaining items as "residuals" and collect them separately;
(w) means for determining if all leaf nodes have been processed; and
(x) if not then
  (x1) means for resuming at (s);
(y) if so then
(z) means for determining if any "residuals" have been collected at this point; and
(aa) if not then
  (aa1) means for storing in a memory any "good" cluster and any "oneoff" cluster, and said memory capable of being displayed to a user
(ab) if yes then
  (ab1) means for gathering said "residuals" collected earlier; and
  (ab2) means for resuming at (q).

8. The hardware based apparatus of claim 7 further comprising:
(ac) means for inputting datasets 1 and 2
(ad) means for inputting a similarity threshold of s*, where $0<=s^*<=1$;
(ae) means for inputting for each said datasets 1 and 2 a "grouping" size G.i, where i=1 or 2;
(af) means for computing, based on datasets 1 and 2 size, an anticipated height of a tree denoted h, and h.i=ceiling (log 2(N.i/G.i)), where i=1 or 2, and N is number of items in dataset i;
(ag) means for building for datasets 1 and 2 a self-join tree using a similarity threshold, $s.i=1-[(1-s^*)/(2^*h.i-1]$, yielding a tree of good groups and oneoff groups;
(ah) means for designating a "topmost" set as an anchor of a root good group, together with members of said oneoff groups;
(ai) means for forming a dataset from said "topmost" set;
(aj) means for performing a self-join on said dataset, using said similarity threshold s*;
(ak) means for outputting from said self-join on said dataset "good" groups that have at least one member from dataset 1, and at least one member from dataset 2 denoting these a s*-join cluster, said s*-join cluster capable of being stored in a memory, and said memory capable of being displayed to a user.

9. The hardware based apparatus of claim 8 wherein said "grouping" size G.i is determined in advance.

10. The hardware based apparatus of claim 8 wherein said "grouping" size G.i minimizes overall computation time of building a similarity index.

\* \* \* \* \*